June 25, 1929.  H. N. PUTNAM  1,718,253
WALL CONDUIT
Filed Jan. 12, 1928  2 Sheets-Sheet 1

Inventor
H. N. Putnam
By Evans & McCoy
Attorneys

June 25, 1929.　　　H. N. PUTNAM　　　1,718,253
WALL CONDUIT
Filed Jan. 12, 1928　　2 Sheets-Sheet 2

Inventor
H. N. Putnam
By
Evans + McCoy
Attorneys

Patented June 25, 1929.

1,718,253

UNITED STATES PATENT OFFICE.

HERBERT N. PUTNAM, OF LAKEWOOD, OHIO.

WALL CONDUIT.

Application filed January 12, 1928. Serial No. 246,203.

This invention relates to wall conduits and more particularly to a wall conduit of the type shown and described in my copending application Serial No. 191,565, filed May 16, 1927, wherein a conduit for electric wiring and for water, gas and air and other pipes leading to various parts of a building is in the form of a structural unit set into the body of a wall and forming a structural part of the wall.

An important object of the present invention is to provide a conduit to which access may be had without disturbing wall plugs or other outlets for wiring or piping. More specifically, the present invention provides a conduit which has a cover provided with a semipermanent section to which all outlets are secured and with a readily removable section by which access may be had to the conduit.

A further object of the invention is to provide a multi-compartment conduit which provides convenient means of connection between permanent conduits imbedded in the floors or walls of the building and any compartment of the conduit.

A further object of the invention is to provide a conduit composed of a structural member of channel form, set into a wall and having an upper flange, the outer edge portion of which is formed to provide a plaster ground and also having a cover plate which overlies the plaster ground and which is secured to the upper flange of the structural member by means of members adapted to be attached to the structural member after the plastering is done so that during the plastering operation there are no projecting parts to interfere with the troweling.

Having in view the objects above set forth and others which will appear as the description proceeds, the invention may be said to comprise the conduit structure as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which Figure 1 is a sectional perspective view showing the invention applied to a combined wall base and conduit construction.

Figure 1:
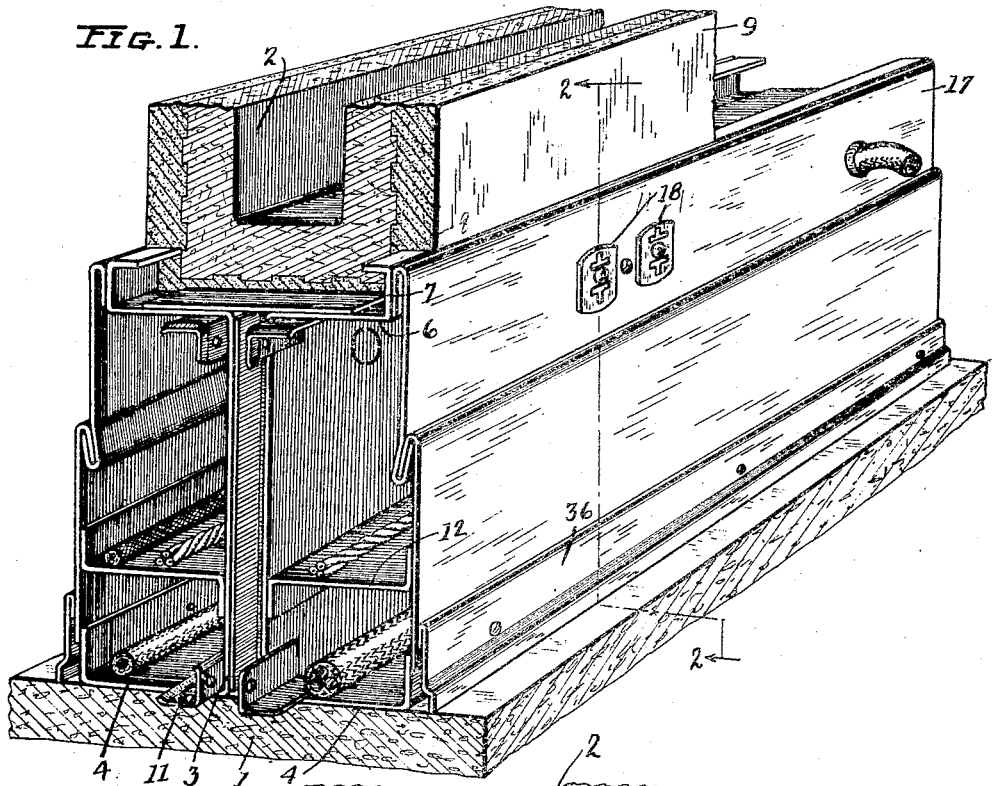

In the accompanying drawing, the invention is illustrated as applied to a combined wall base and conduit construction in which the combined base and conduit is mounted upon a floor 1 and forms the base of a masonry wall 2. The body portion of the combined wall base and conduit structure consists of two channel shaped structural members 3 arranged back to back with their webs spaced apart to provide a central chamber between them. Each of the channel shaped members has a lower flange 4 which rests upon the floor 1 and which is provided with an upturned outer edge portion 5. Each of the channel shaped members has an upper flange 6 which has an outer edge portion which is bent upwardly to provide a vertical face portion 7 and horizontal plaster ledge 8. The edge portion of the upper flange 6 provides a ground for the plaster 9, the outer surface of which lies in the plane of the vertical face 7 of the ground which serves as a guide in troweling the plaster. The wall supporting base structure composed of the two channel shaped structural members is made in sections of suitable length, the channel members of each section being joined at intervals along their length by suitable spacers such as vertical Z shaped spacer posts 10, the flanges of which are welded or otherwise suitably secured to the webs of the channel members. The sections are joined end to end by means of suitable angle clips 11 secured in the angles of the channels and overlapping the joints between the sections.

Each of the channel members of the base structure provides a conduit for wiring or piping, the conduits opening to opposite sides of the wall. Each of the conduits is divided by a horizontal partition member 12 suitably secured to the web of the channel member. The partition members divide the conduits into upper compartments 13 which may contain suitable conductor cables or wires 14 and lower compartments 15 which may contain suitable conductor cables or wires 16. One of the compartments of each conduit may contain high tension wires and the other compartments low tension wires. The partition members 12 are positioned below the centers of the conduits so that the upper compartments 13 are deeper than the lower compartments 15 for a purpose which will be presently made clear. The upper compartments 13 are partially closed by outlet panels 17, the upper edges of which are secured to the upper flanges 6 of the channel members and the lower edges of which are spaced above the partition members 12. The outlet panel 17 has suitable wall plugs 18 attached thereto to which electric light wires may be attached and any outlets for other wires or for piping are formed in the panel 17.

The central space between the webs of the channel members 3 is adapted to receive permanent conduits imbedded in the wall or floor and makes convenient the leading in of wires from a lower floor or through the wall. Conduits may extend through the floor into a space between the channel members and these conduits may be connected through suitable openings to either compartment of the conduit so that wires from a lower floor may be lead into the conduit.

Figure 2:
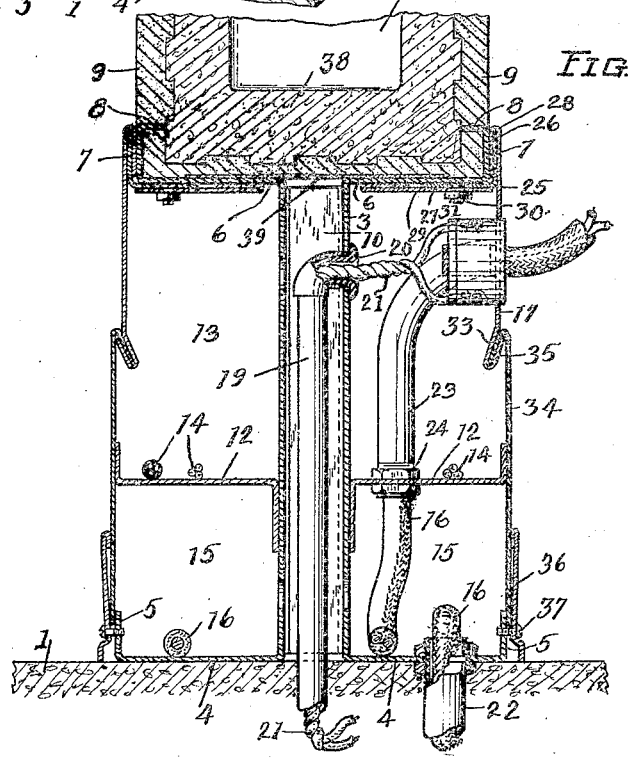
Fig. 2 is a section taken on the line indicated at 2—2 in Fig. 1.
Figure 3:
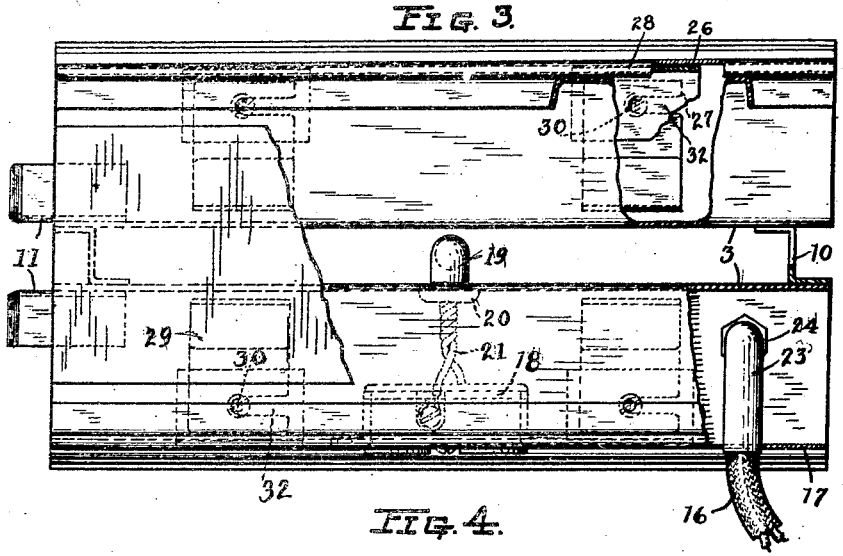
Fig. 3 is a plan view of a section of the combined wall base and conduit structure with portions broken away to show the interior construction.
Figure 4:
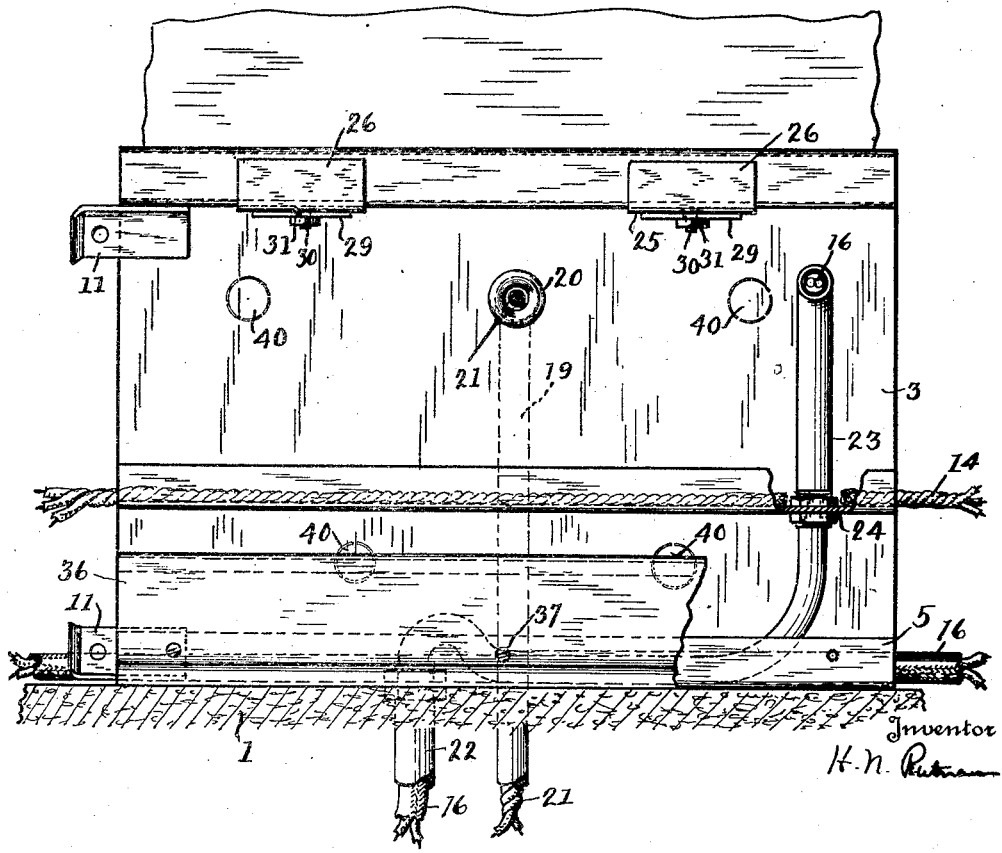
Fig. 4 is a side elevation of a section of the conduit with the cover plates removed.

As shown herein, the upper end of a conduit 19 is connected to a bushing 20 formed of insulating material and extending through an opening in the web of one of the channel members and the wires 21 extending through the conduit 19 are shown attached to one of the wall plugs 18 mounted on the outlet panel 17. Wires may be lead into the lower compartments of the conduit through a conduit in the floor, extending through an opening in the bottom flange 4, as shown in Fig. 2 in which a conductor cable 16 is shown entering the lower compartment through a conduit 22 connected to the bottom flange.

Since one compartment of each conduit is for high tension wires and the other for low tension wires and the outlet panel is positioned over the upper compartment only, short conduits 23 are provided for conductor cables leading from the lower low tension compartment 15. Each conduit 22 is connected at its upper end to an outlet in the panel 17 and is detachably secured at its lower end to the partition member 12 by means of clamping nuts 24, the conduit 23 serving to protect the low tension wires or cables from the high tension wires in the upper compartment 13.

The outlet panels 17 are secured to the upper flanges 6 of the channel shaped structural members 3 by means of angle shaped clips 25 which when secured to the flanges 6 have vertical flanges 26 overlying the vertical faces 7 at the outer edges of the flanges 6. The clips 25 have horizontal flanges 27 detachably secured to the under sides of the flanges 6 and the outlet panel 17 has a reversely turned flange 28 at its upper edge which hooks over the flanges of the clips and fits between a flange of the clip and the vertical face 7 of the plaster ground. It is desirable when the wall is plastered, that there be no clips or other projecting parts on the upper flanges of the channel members to interfere with the troweling and for this reason, means is provided for attaching the retaining clips after the plastering is done. To this end sheet metal clamping strips 29 are provided at intervals along the length of the flanges 6 on the under sides thereof and these clamping strips are secured by welding or other suitable means along their inner edges to the flanges 6, the outer portions of the clamping strips being spaced from the flanges 6 sufficiently to permit the flanges 27 of the retaining clips 25 to be inserted between the clamping strips and the under faces of the flanges 6. Bolts 30 are attached at intervals to the flanges 6 and these bolts project downwardly from the flanges through the clamping strips 29 and have nuts 31 at their lower ends. The clips 25 are each provided with a longitudinal slot 32 extending from one end adapted to receive one of the bolts 30 and the clips are secured in place by sliding the same longitudinally into the spaces between the clamping strips 29 and flanges 6 and onto the bolts and then tightening the nuts 31 to draw the strips 29 into tight clamping engagement with the flanges 27.

The lower edges of the outlet panel 17 are bent inwardly at a slight angle and back upon themselves to provide upwardly opening flange receiving channels 33 and the space between the lower edge of each panel 17 and the bottom of the conduit is closed by a removable panel 34 which has an inturned flange 35 at its upper edge which fits in the channel 33 of the outlet panel. The removable panel 34 has its lower edge overlying the upturned portion 5 of the lower flange of the bottom member and the lower portion of this panel is covered by a mop strip 36 which is attached to the upstanding edge portion 5 by means of screws 37 which lie below the lower edge of the removable panel 34. The panel 34 may be removed by loosening the screws 37 sufficiently to permit the panel to be lifted bodily out of engagement with the channel 31 of the outlet panel and since the lower edge of the outlet panel is spaced considerably above the partition member 12, access may be had to both the upper compartment 13 and the lower compartment 15 of the conduit upon removal of the panel 34.

In building the wall, the supporting base formed by the oppositely disposed channels 3 is secured upon the floor and the body of the wall which may be composed of tiles 38 is built upon the supporting base, a cover plate 39 being preferably placed along the top of the channel members to tightly enclose the space between the channel members. Plaster 9 is then applied to the walls and after the plaster is applied, the angle clips 25 are secured in place on the flanges 6 of the channel members. The outlet panel 17 is then secured in place on the angle clips 25, and electric light wires are attached to the plugs 18 and the plugs are secured in the panel 17 at any desired point along the length thereof, also low tension wires may be passed through outlets provided at any desired points along the length of the panel 17. The removable panel 34 is then attached to the outlet panel after which the mop strip 36 is secured in place.

To facilitate the connection of the room conduits in the wall base with conduits leading into the central space between the room conduits, the webs of the channel shaped body members 3 may be provided with rows of knockout discs 40 which are partially severed so that when any one of them is knocked out, an opening is provided for the reception of a bushing for attachment to a conduit in the space between the channel members, thus providing for the leading of wires into any compartment of either conduit at the desired points along the length thereof.

It will be apparent that the present invention provides a built-in conduit structure to which access may be had at any time without disturbing any outlet connections; that the wiring conduit provides a plaster ground without any projecting parts which interfere with the troweling and that the conduit structure provides convenient means of connection with permanent conduits or pipes imbedded in the walls or the floors.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A wall conduit for lines of wiring or piping comprising a channel shaped structural member, an outlet panel through which all connections are made to the lines within the conduit, said panel being secured to one flange of said member and extending partially across the channel, and a removable panel covering the space between the outlet panel and the opposite flange of said member, whereby access may be had to the interior of the conduit without disturbing said connections.

2. A wall conduit for lines of wiring or piping comprising a channel shaped structural member set into the wall with its open side substantially flush with a face of the wall, an outlet panel through which all connections are made to the lines within the conduit, said panel being of less width than said member and secured at its upper edge to the upper flange of said member, and a removable panel detachably secured along its upper edge to said outlet panel and covering the space between said outlet panel and the lower flange of said member, whereby access may be had to the interior of the conduit without disturbing said connections.

3. A wall conduit for lines of wiring or piping comprising a channel shaped structural member set into the wall with its open side substantially flush with a face of the wall, an outlet panel through which all connections are made to the lines within the conduit, said panel being of less width than said member and secured at its upper edge to the upper flange of said member, a removable panel detachably secured along its upper edge to said outlet panel and covering the space between said outlet panel and the lower flange of said member, and a partition member dividing the conduit into upper and lower compartments, said partition member being positioned below the lower edge of said outlet panel to afford access to both compartments upon removal of the removable panel without disturbing said connections.

4. A wall conduit for lines of wiring or piping comprising a channel shaped structural member set into the wall with its open side substantially flush with a face of the wall, an outlet panel through which all connections are made to the lines within the conduit, said panel being of less width than said member and secured at its upper edge to the upper flange of said member, a removable panel detachably secured along its upper edge to said outlet panel and covering the space between said outlet panel and the lower flange of said member, and a partition member secured to the web of said member and dividing said conduit into upper and lower compartments, said partition member being positioned below the longitudinal center of said conduit and below the lower edge of the outlet panel to afford access to both compartments upon removal of the removable panel without disturbing said connections.

5. A wall conduit having an open side and set into the wall with its open side substantially flush with a face of the wall, the top wall of said conduit having an edge portion bent upwardly and back upon itself to provide a plaster ground, angle shaped clips, each having an upwardly extending flange overlying the upturned edge portion of said top wall, means for detachably securing the other flanges of the clips to the under face of said top wall, and an outlet panel having its upper edge bent back upon itself to hook over the upwardly extending flanges of said clips.

6. A wall conduit having an open side and set into the wall with its open side substantially flush with a face of the wall, the top wall of said member having an edge portion bent upwardly and back upon itself to provide a plaster ground, angle shaped clips, bolts carried by said top wall and projecting from the under side thereof, angle shaped clips each having one of its flanges adapted to overlie the upturned edge portion of said top wall and the other of its flanges provided with a slot extending from an end thereof to receive said bolt, and an outlet panel having a flange at its upper edge adapted to fit between the flange of the clip and the wall.

7. A wall conduit having an open side and set into the wall with its open side substantially flush with a face of the wall, the top and bottom walls of said conduit having upturned edge portions, angle shaped clips, each having one flange detachably secured to the under side of the top wall of said member and the other flange overlying and spaced from the upturned edge portion of said top wall, an outlet panel having its upper edge bent back upon itself to hook over said clips and its lower edge bent back upon itself to provide a flange receiving channel, a removable panel having its upper edge bent back upon itself to hook into the channel at the lower edge of said outlet panel and a mop strip detachably secured to the upturned edge portion of the bottom wall of said conduit and covering the lower edge of said removable strip.

8. A wall conduit having an open side and set into the wall with its open side substantially flush with a face of the wall, the top and bottom walls of said conduit having upturned edge portions, angle shaped clips, each having one flange detachably secured to the under side of the top wall of said member and the other flange overlying and spaced from the upturned edge portion of said top wall, an outlet panel having its upper edge bent back upon itself to hook over said clips and its lower edge bent back upon itself to provide a flange receiving channel, a removable panel having its upper edge bent back upon itself to hook into the channel at the lower edge of said outlet panel, the lower edge of said removable panel overlying the upturned edge portion of the bottom wall of said member, a mop strip overlying the lower edge of said removable panel, and screws securing said mop strip to the upturned edge portion of said bottom wall below the lower edge of said removable panel.

9. A wall base comprising a pair of channel shaped structural members arranged back to back with their webs spaced apart to provide a central chamber, spacing members interposed between the webs of said members, panels covering the open sides of said channel members to form closed conduits, and one or more conduits extending into said central chamber and communicating with one of the conduits of said base.

10. A wall base comprising a pair of channel shaped structural members arranged back to back with their webs spaced apart to provide a central chamber, spacing members interposed between the webs of said members, panels covering the open sides of said channel members to form closed conduits, said webs having knockout discs partially severed from the body thereof at spaced points along their length whereby openings to said central chamber may be provided.

11. A wall construction including a metallic channel shaped structural member imbedded in the wall and forming a support for body of the wall above the same, said member having a supporting web disposed in upright position in the wall and having flanges extending outwardly to one side of the wall, an outlet panel secured to one flange of said structural member and extending partially across the channel, and a removable panel covering the space between the outlet panel and the opposite flange of the structural member.

12. A wall construction including a metallic channel shaped structural member imbedded in the wall and forming a support for body of the wall above the same, said member having a supporting web disposed in upright position in the wall and having flanges extending outwardly to one side of the wall, an outlet panel secured to one flange of said structural member and extending partially across the channel, a removable panel covering the space between the outlet panel and the opposite flange of the structural member, and a horizontal partition member secured to the web intermediate said flanges and lying behind said removable panel.

13. A wall conduit set into a wall with an open side substantially flush with the face of the wall, said conduit having a sheet metal top wall provided with edge flanges forming plaster grounds, clips attached to said top wall, an outlet panel of less width than the height of the conduit and having its upper edge secured to said clip, said panel having its lower edge bent back upon itself to form a flange receiving channel, a removable panel bridging the space between the lower edge of the outlet panel and the bottom of the conduit, said removable panel having a flange along its upper edge engaging in the channel of the outlet panel.

14. A wall conduit having a longitudinal partition intermediate top and bottom walls thereof dividing the conduit into upper and lower compartments, a side wall composed of upper and lower longitudinally extending panels, one of said panels being an outlet panel and of a width less than the depth of the compartment which it overlies, the other of the panels overlying both compartments and being removable to afford access to both compartments, and a conduit in the compartment which said outlet panel overlies, extending from said partition to said outlet panel for enclosing wires leading from the other compartment to the outlet panel.

15. A wall conduit for lines of wiring or piping having top and bottom walls and a side wall composed of upper and lower longitudinally extending panels, one of said panels being an outlet panel through which connections are made to lines within the conduit, said panel being of a width less than the space between the top and bottom walls and spaced from one of said walls, the other of said panels bridging the space between the outlet panel and said last mentioned wall and being removable independently of the outlet panel to afford access to the interior of the conduit without disturbing said connections.

16. A wall conduit for lines of wiring or piping having top and bottom walls and an intermediate partition dividing the conduit into upper and lower compartments, said conduit having a side wall composed of upper and lower longitudinally extending panels, one of said panels being an outlet panel through which connections are made to the lines within the conduit, said panel being of a width less than the depth of the compartment which it overlies and partially covering the same, the other panel overlying both compartments and being removable independently of the outlet panel to afford access to the interior of both compartments without disturbing said connections.

17. A wall conduit for lines of wiring or piping having top and bottom walls and a side wall composed of a longitudinally extending outlet panel through which connections are made to the lines within the conduit, said panel being of a width less than the height of the conduit and attached along its upper edge to the top wall of the conduit, and a panel covering the space between the lower edge of the outlet panel and the bottom wall and attached along its upper edge to the outlet panel, said panel being removable independently of the outlet panel to afford access to the interior of the conduit without disturbing said connections.

In testimony whereof I affix my signature.

HERBERT N. PUTNAM.